United States Patent
Kobayashi

(10) Patent No.: US 8,252,482 B2
(45) Date of Patent: Aug. 28, 2012

(54) SOLID POLYMER FUEL CELL

(75) Inventor: Kenji Kobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 309 days.

(21) Appl. No.: 12/600,218

(22) PCT Filed: Apr. 30, 2008

(86) PCT No.: PCT/JP2008/058586
§ 371 (c)(1),
(2), (4) Date: Nov. 13, 2009

(87) PCT Pub. No.: WO2008/143020
PCT Pub. Date: Nov. 27, 2008

(65) Prior Publication Data
US 2010/0239943 A1    Sep. 23, 2010

(30) Foreign Application Priority Data
May 14, 2007    (JP) .................................. 2007-128040

(51) Int. Cl.
*H01M 8/02*    (2006.01)
*H01M 8/04*    (2006.01)
*H01M 8/10*    (2006.01)

(52) U.S. Cl. .......................... 429/515; 429/492; 429/512

(58) Field of Classification Search .................. 429/492, 429/512, 515
See application file for complete search history.

(56) References Cited

FOREIGN PATENT DOCUMENTS

| JP | 04274174 A | * | 9/1992 |
|---|---|---|---|
| JP | 2004071262 A | | 3/2004 |
| JP | 2004529460 A | | 9/2004 |
| JP | 2004335314 A | * | 11/2004 |
| JP | 2005524952 A | | 8/2005 |
| JP | 2006019162 A | | 1/2006 |
| JP | 2006049032 A | | 2/2006 |
| JP | 2006269126 A | | 10/2006 |
| JP | 2006318712 A | | 11/2006 |
| JP | 2007087655 A | | 4/2007 |
| JP | 2007173110 A | * | 7/2007 |
| JP | 2008016258 A | | 1/2008 |
| JP | 2008084609 A | | 4/2008 |

OTHER PUBLICATIONS

International Search Report for PCT/JP2008/058586 mailed Aug. 12, 2008.

* cited by examiner

*Primary Examiner* — Gregg Cantelmo

(57) ABSTRACT

A fuel cell includes a power generation portion. The power generation portion at least has a fuel electrode, an oxygen electrode, a solid polymer electrolyte membrane interposed therebetween, and a first opening member including an opening on the fuel electrode side. The fuel cell includes a fuel storage portion storing fuel and including a second opening member that includes an opening. The fuel cell includes a container portion provided on the power generation portion containing the fuel storage portion. The container portion is designed to contain the fuel storage portion such that the fuel storage portion is attachable to and detachable from the power generation portion, while the opening of the first opening member and the opening of the second opening member are positioned so as to be communicable with each other.

2 Claims, 6 Drawing Sheets

(a)

(b)

(a)

(b)

(a)

(b)

(a)

(b)

(c)

(a)

(b)

SOLID POLYMER FUEL CELL

TECHNICAL FIELD

This invention relates to a solid polymer fuel cell and a fuel supplying method.

BACKGROUND ART

Solid polymer fuel cells using alcohol fuel are easy to reduce in size and weight. For this reason, they are now actively researched and developed as power supply for various electronic devices comprising portable devices.

Solid polymer fuel cells comprise a membrane-and-electrode assembly (MEA) in which a solid polymer electrolyte membrane is held between a fuel electrode and an oxygen electrode. The fuel cells of a type designed to supply liquid fuel directly to the fuel electrode are referred to as direct fuel cells, and produce cations, electrons, and intermediates by decomposing the supplied liquid fuel with catalyst supported by the fuel electrode. In this type of fuel cells, the so produced cations move to the oxygen electrode side, passing through the solid polymer electrolyte membrane, and the so produced electrons move to the oxygen electrode side via an external load, so that the cations and the electrodes react with oxygen in air in the oxygen electrode to generate power. For example, in the case of a direct-methanol-type fuel cell (hereafter, referred to as the DMFC) using aqueous methanol solution directly as liquid fuel, a reaction represented by the following formula 1 takes place in the fuel electrode, while a reaction represented by the following formula 2 takes place in the oxygen electrode.

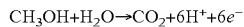

$$CH_3OH + H_2O \rightarrow CO_2 + 6H^+ + 6e^- \qquad 1$$

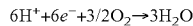

$$6H^+ + 6e^- + 3/2 O_2 \rightarrow 3H_2O \qquad 2$$

In order to ensure stable operation of the fuel cell using the reaction formulae above, it is necessary to constantly supply the MEA fuel electrode functioning as a power generation portion with alcohol fuel such as methanol in an amount required for power generation. Conventionally, means for supplying alcohol fuel to an MEA serving as a power generation portion has been widely been provided by a method in which a tank storing liquid fuel is incorporated in a fuel cell body or externally attached thereto in the form of a cartridge for supplying the liquid fuel directly.

Japanese Laid-Open Patent Publication No. 2004-71262 (Patent Document 1), for example, discloses a fuel cell designed to feed liquid fuel from a fuel cartridge to a fuel storage layer integrated with a power generation portion by means of a liquid feeding pump, for supplying the fuel to a fuel electrode of a MEA as the power generation portion.

Japanese Laid-Open Patent Publication No. 2006-49032 (Patent Document 2) discloses a fuel cell system in which a collecting tank is provided for collecting product water and by-products produced in an electrostatic generator.

Japanese Kohyo Patent Publication No. 2005-524952 (Patent Document 3) proposes a technique to separate a power generation section from a fuel cartridge section by using a detachable cartridge comprising a perforated porous structure, claiming that the fuel supply is possible with a simple configuration without the need of a collecting mechanism as described above.

Japanese Laid-Open Patent Publication No. 2006-19162 (Patent Document 4) discloses a technique in which a plurality of gas diffusion layers comprising regions with different gas permeability are stacked, and the gas permeability of the gas diffusion layers is changed by changing their overlapping condition.

Japanese Kohyo Patent Publication No. 2004-529460 (Patent Document 5) discloses a fuel cell for obtaining high efficiency in a low load region by adjusting the size of the cell surface where fuel cell reactions occur by moving a porous plate in a path for supplying a reaction medium.

Japanese Laid-Open Patent Publication No. 2006-269126 (Patent Document 6) discloses a fuel cell in which three membranes comprising a hydrophobic porous membrane, a polymeric swollen membrane, and a gas-liquid separation membrane are stacked in this order from the fuel electrode side for realizing uniform supply of fuel.

DISCLOSURE OF THE INVENTION

The fuel cells described in Patent Documents 1 and 2 require a pump, and inevitably comprise a complicated configuration in which a stacked portion incorporating a MEA assumes a special connector shape, for example.

According to the technique described in Patent Document 3, the fuel supply to the power generation portion cannot be controlled at all. In addition, the configuration to constantly supply the fuel to the fuel electrode poses a high risk that the liquid fuel is left in the power generation portion when the cell is stored, for example. This will result in formation of a local cell in the fuel electrode, and deteriorate the power generation portion. No mention is made on leakage of liquid at the time of attachment or detachment of the cartridge.

Patent Document 4 relates to a mechanism for discharging water as a reaction product and not to a mechanism for controlling fuel supply. No mention is made on the supply of fuel.

Patent Document 5 discloses a technique to change the opening area of a fuel supplying portion, but does not describe the relationship between the fuel supplying portion and a gas-liquid separation membrane or a fuel storage portion. The technique may pose a risk of complicating the configuration.

The fuel cell described in Patent Document 6 is not capable of adjusting the fuel supply and requires a structure comprising as many as three layers.

It is a main object of this invention to provide a method for realizing stable fuel supply to a power generation portion with a simple configuration, and a fuel cell using such a method. In other words, it is an object of the invention not only to significantly improve the convenience but also to realize stable power generation and storage characteristics by controlling the fuel supply with a simpler configuration than conventional techniques.

A first aspect of this invention provides a fuel cell comprising a power generation portion at least comprising a fuel electrode, an oxygen electrode, and a solid electrolyte membrane interposed therebetween, and a fuel storage portion provided connectably to the power generation portion for storing fuel. The power generation portion comprises a first opening member with an opening on the fuel electrode side, while the fuel storage portion comprises a second opening member with an opening. The opening of the first opening member and the opening of the second opening member are communicable with each other.

Another aspect of this invention provides a fuel supply control method for a fuel cell which comprises a power generation portion comprising a fuel electrode comprising a first opening member with an opening, an oxygen electrode, and a solid electrolyte membrane interposed therebetween, and a fuel storage portion for storing fuel and comprising a second opening member with an opening, the fuel storage portion comprising the second opening member being designed to be detachable from and relatively movable to the power generation portion. The fuel supply to the fuel electrode can be controlled by relatively moving the fuel storage portion comprising the second opening member to the first opening member so as to change the opening area in which the opening of the first opening member and the opening of the second opening member communicate with each other.

ADVANTAGEOUS EFFECTS OF THE INVENTION

This simple configuration makes it possible to easily control the fuel supply from the fuel storage portion to the fuel electrode regardless of a type of the fuel, whereby the fuel cell can be reduced in size and weight while improving the power generation performance remarkably. The provision of the gas-liquid separation membrane in the fuel storage portion and the power generation portion makes it possible to safely attach/detach the fuel storage portion to/from the power generation portion and to further improve the storage characteristics and the starting characteristics.

LIST OF REFERENCE NUMERALS

Figure 1:
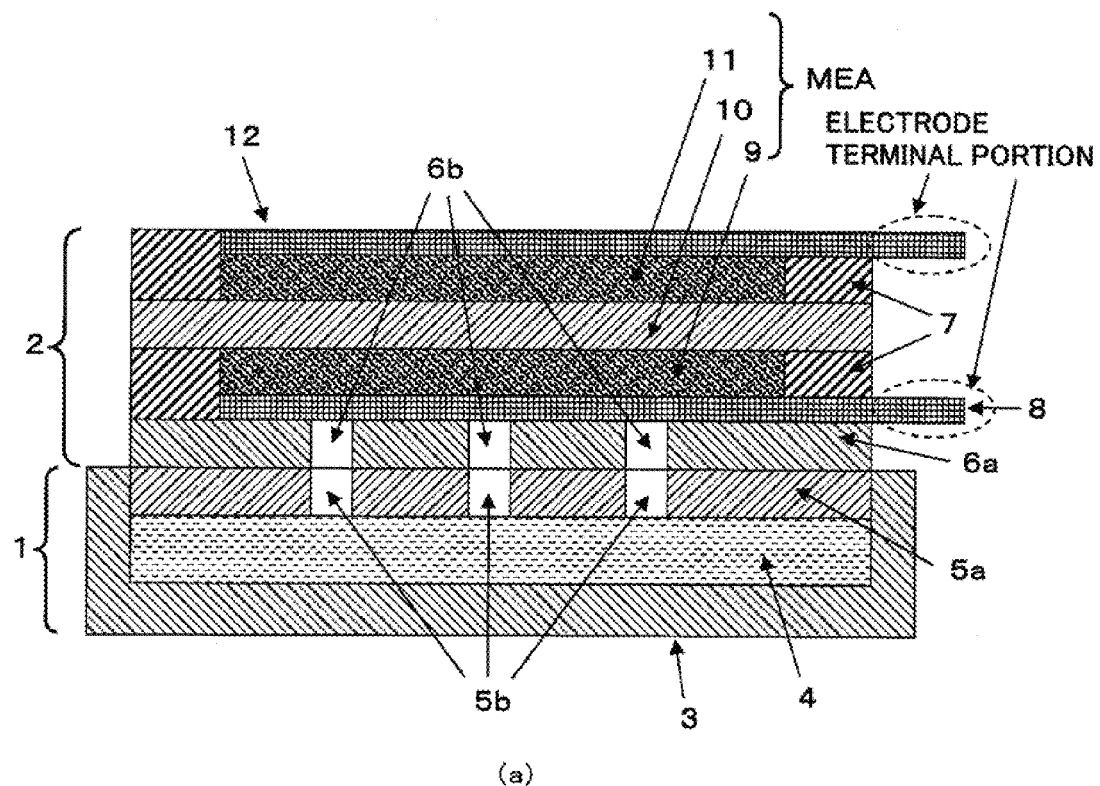
FIG. 1 shows cross-sectional views illustrating a fuel supplying method for a solid polymer fuel cell according to an embodiment of this invention, FIG. 1(a) being a cross-sectional view showing a case in which pore plates comprise an opening ratio of 100%, FIG. 1(b) being a cross-sectional view showing a case in which pore plates comprise an opening ratio of 0%.
Figure 1:
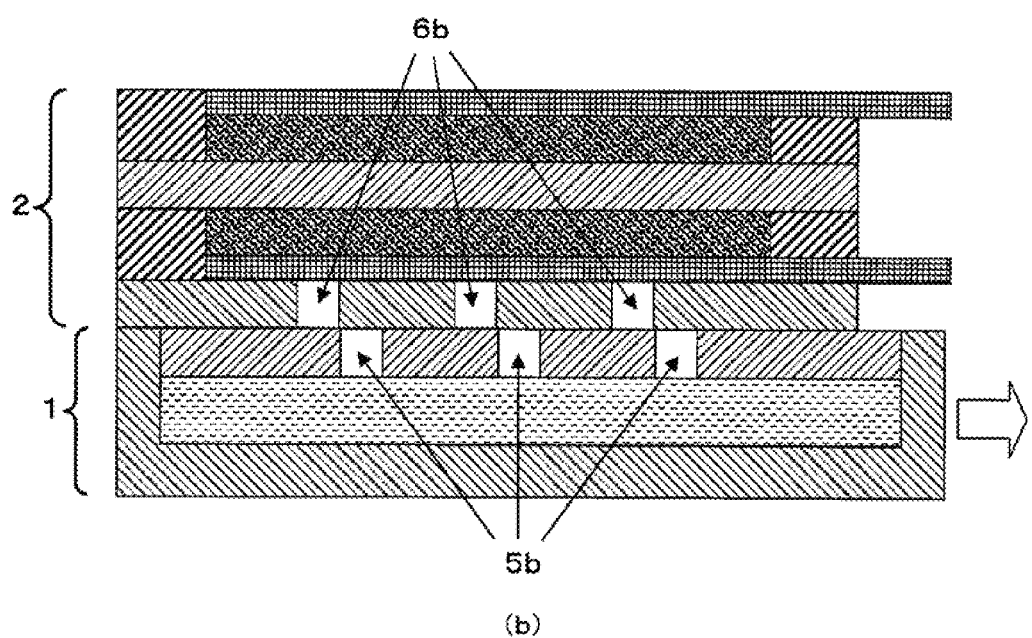

1 Fuel storage portion
2 Power generation portion
2a container portion
3 Frame
4 Fuel holding portion
5a Pore plate (fuel storage portion side)
5b Opening (fuel storage portion side)
6a Pore plate (power generation portion side)
6b Opening (power generation portion side)
7 Sealant
8 Fuel electrode current-collecting portion
9 Fuel electrode catalyst layer
10 Solid polymer electrolyte membrane
11 Oxygen electrode catalyst layer
12 Oxygen electrode current-collecting portion
20 Porous membrane (fuel storage portion side gas-liquid separation membrane)
21 Porous membrane (power generation portion side gas-liquid separation membrane)
22 Container portion frame
23 Fuel storage portion inserting space
24 MEA holder plate (also serving as oxygen electrode air inlet)
25 Sealant

BEST MODE FOR CARRYING OUT THE INVENTION

Figure 3:
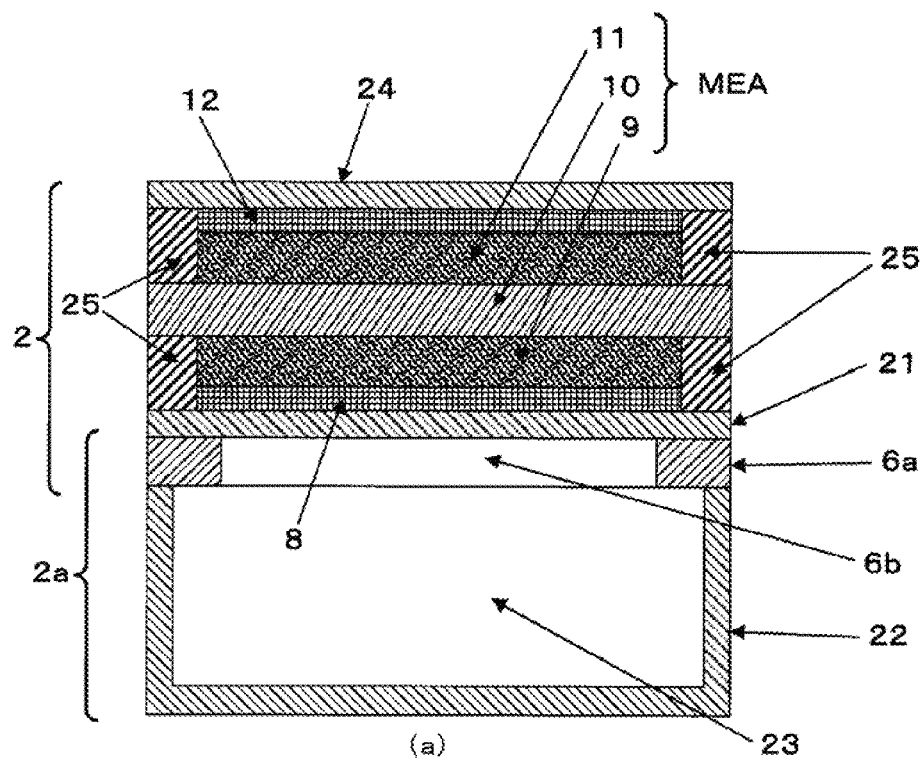
FIG. 3 shows configuration diagrams of a detachable fuel storage portion and a power generation portion corresponding thereto, FIG. 3(a) being a longitudinal cross-sectional view showing a power generation portion of a fuel cell comprising a detachable fuel storage portion, FIG. 3(b) being a transverse cross-sectional view showing the power generation portion of the fuel cell comprising a detachable fuel storage portion.
Figure 3:
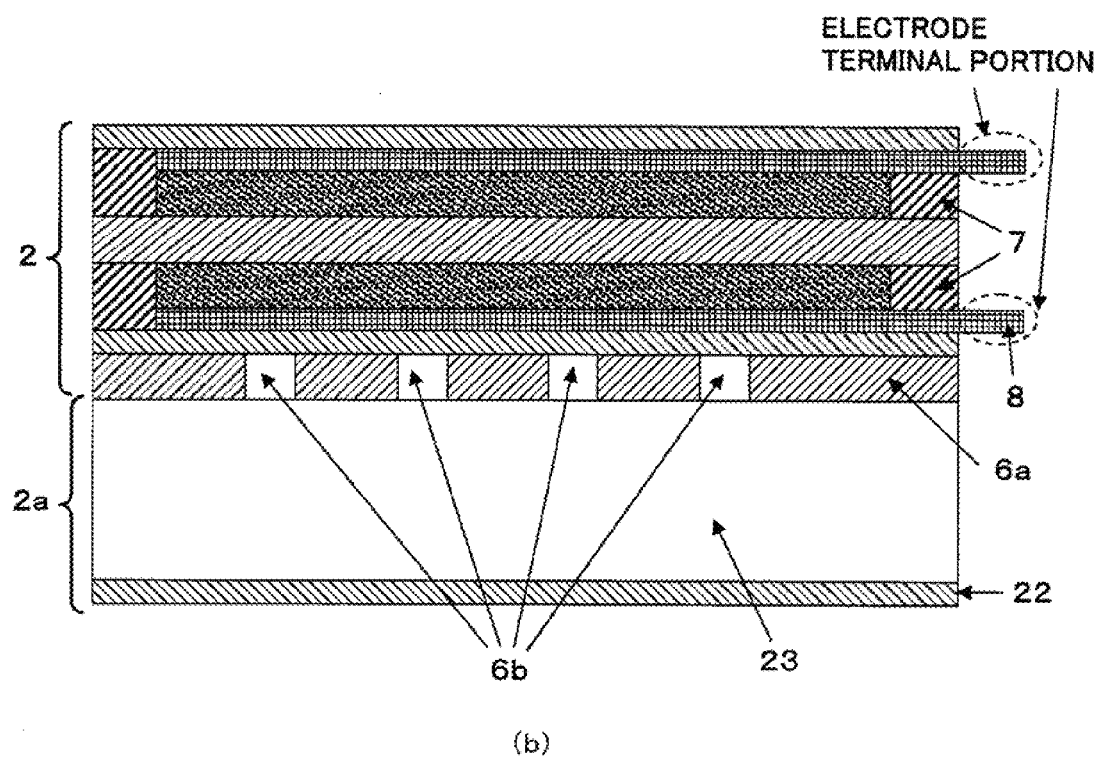

A solid polymer fuel cell according to this invention will be described with reference to the accompanying drawings. FIG. 1 shows cross-sectional views illustrating a fuel supplying method for a solid polymer fuel cell according to an embodiment of this invention. FIG. 3 shows configuration diagrams of a detachable fuel storage portion and a power generation portion corresponding thereto. It should be understood that this invention is not limited to these drawings and embodiments described below.

As shown in FIG. 1(a), a solid polymer fuel cell according to this invention comprises an MEA (Membrane-and-Electrode Assembly) which is formed by sandwiching a solid polymer electrolyte membrane 10 between a fuel electrode catalyst layer 9 and a oxygen electrode catalyst layer 11, the layers 9 and 10 being disposed in contact with the opposite surfaces of the solid polymer electrolyte membrane 10. A power generation portion 2 is formed by sandwiching this MEA between an oxygen electrode current-collecting portion 12 and a fuel electrode current-collecting portion 8. The fuel cell further comprises a configuration in which a pore plate 5a (second opening member) and a pore plate 6a (first opening member) are attached to the fuel electrode current-collecting portion 8 and the fuel storage portion 1 facing thereto, respectively.

The fuel storage portion 1 is provided connectably to the power generation portion 2 and constructed so as to be displaced relatively.

The pore plate 5a and the pore plate 6a comprise openings 5b and 6b, respectively. As shown in FIGS. 1(a) and 1(b), the alignment between the openings 5b and 6b in the opposing pore plates 5a and 6a can be varied by moving the position of the fuel storage portion 1 relative to the power generation portion 2.

For example, in FIG. 1(a), the openings 5b and 6b of the two pore plates are completely aligned with each other, and thus the effective opening ratio of the pore plates for supplying fuel from the fuel storage portion 1 to the fuel electrode (8+9) is 100%. In contrast, in the case of FIG. 1(b), the openings of the two pore plates are not aligned at all, and thus the effective opening ratio of the pore plates for transmitting the fuel is 0%. Further, the effective opening ratio will vary from 100% to 0% in the course of changing from the state shown in FIG. 1(a) to the state shown in FIG. 1(b). As described above, the fuel storage portion 1 and the power generation portion 2 are constructed so as to be communicable with each other through the openings 5b and 6b, which makes it possible to control the fuel supply from the fuel storage portion 1 to the fuel electrode by changing the alignment between the openings of the pore plates attached to the fuel storage portion 1 and the fuel electrode. The two pore plates are desirably arranged with as small space as possible in order to prevent leakage of fuel from other parts than the openings.

In order to ensure the opening ratio of 0% can be established, the positions and shape of the openings of the pore plates must be determined such that the openings are formed to be discrete in a displacement direction, but no other particular limitations are posed. Each of the pore plates itself desirably comprises an opening ratio of 50% or less. As shown in FIG. 1(a), openings comprising the same opening area are disposed regularly, so that the opening ratio can be varied continuously along with the parallel displacement of the pore plates.

Figure 2:
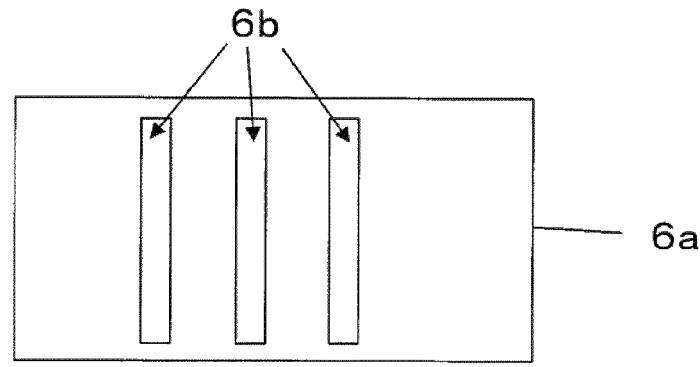
FIG. 2 shows plan views illustrating a fuel supplying method for a solid polymer fuel cell according to an embodiment of this invention, FIG. 2(a) being a plan view showing a positional relationship between pore plates when the opening ratio is 100%, FIG. 2(b) being a plan view showing a positional relationship between the pore plates when the opening ratio is 0%.
Figure 2:
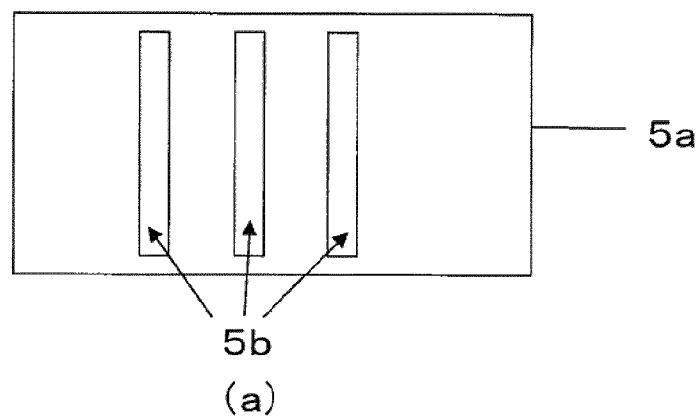
Figure 2:
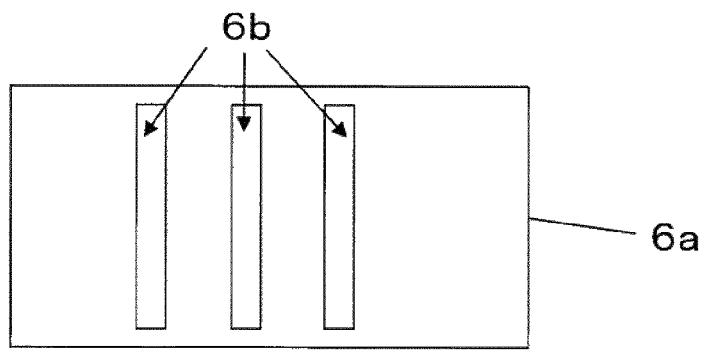
Figure 2:
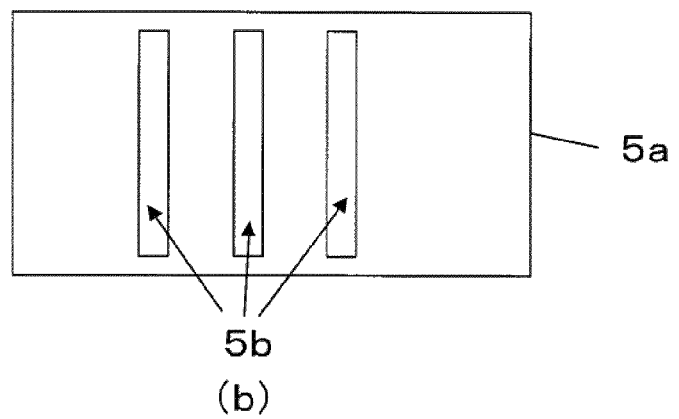

FIG. 2 shows the pore plate 5a and the pore plate 6a according to the embodiment of FIG. 1 juxtaposed in plan views in order to facilitate the understanding of alignment of the pore plates 5a and 6a. In FIG. 2, rectangular openings 5b and 6b are formed discretely and regularly at three places, respectively. FIG. 2(a) is a plan view corresponding to the state shown in FIG. 1(a) where the openings are aligned completely with each other, and FIG. 2(b) is a plan view corresponding to the state shown in FIG. 1(b) where the openings are not aligned completely.

The pore plates are desirably made of a plastic product comprising resistance to chemicals or a metal product coated with a chemical resistant material. In addition, the pore plates desirably comprise rigidity in order to eliminate the flexure to enhance the adhesion between the two pore plates.

It is made possible to utilize the fuel supply control of this invention even more effectively if a material comprising gas-liquid separation properties is used for the openings of the pore plates so that the vaporized fuel is supplied. FIG. 3 specifically shows a fuel cell configuration utilizing such vaporization supply.

Referring to FIG. 3, specific description will be made of a configuration and manufacturing method of a detachable fuel storage portion and a power generation portion corresponding thereto. FIG. 3(a) is a longitudinal cross-sectional view showing a power generation portion 2 and a container portion 2a as viewed in a longitudinal direction. FIG. 3(b) is a transverse cross-sectional view thereof as viewed in a transverse direction. A solid polymer electrolyte membrane 10 used in the power generation portion 2 is not limited particularly, and any of those commercially available and used in Examples described later may be used. This solid polymer electrolyte membrane is sandwiched between a fuel electrode and an oxygen electrode, both of which are formed by applying a catalyst paste containing carbon particles supporting a catalyst (catalyst layers 9 and 11) on a porous substrate (current-collecting portions 8 and 12). This porous substrate may be metal mesh or carbon cloth comprising electric conductivity. The fuel electrode (8+9) and the oxygen electrode (11+12) thus prepared are disposed such that their catalyst layer sides face the solid polymer electrolyte membrane 10 and are thermally compressed to each other, whereby an MEA comprising a current-collecting portions is obtained.

The porous substrate used for the fuel electrode and oxygen electrode is provided, at an end thereof, with an electrode terminal portion for drawing current so that it can also function to collect current. The electrode terminal portion is desirably integrated with the porous substrate in order to more simplify the configuration. No catalyst layer is formed on the electrode terminal portion.

Further, it is desirable that, as shown in FIG. 3, the solid polymer electrolyte membrane 10 forming the MEA be formed in a slightly greater size than the fuel electrode catalyst layer 9 and the oxygen electrode catalyst layer 11 in order to prevent short-circuit between the fuel electrode and the oxygen electrode.

A sealants 25 comprising a thickness corresponding to that of the relevant electrode is provided on the part of the solid polymer electrolyte membrane where the electrodes do not overlap with each other. This makes it possible to significantly prevent short-circuit between the fuel electrode and the oxygen electrode as well as transmission of the fuel through the solid polymer electrolyte membrane 10. As described later, the sealant 25 is required to function as a gas outlet of the fuel electrode and is also required in a manufacturing step of integrating the cell with a frame.

The material for the sealant 25 is not limited particularly as long as it has a certain level of insulating performance and sealing performance. For example, the material may be a resin such as silicon rubber and PPS (polyphenylene sulfide), or a polymer porous body.

It is desirable here to use a porous body comprising gas-liquid separation properties for the sealant 25 used on the fuel electrode side in order to externally discharge $CO_2$ gas produced during reaction.

The shape of the MEA used in this invention is not limited particularly, and the single-type MEA as described above may be used as it is for a power generating stack in which a plurality of MEAs are stacked and electrically joined in series, or juxtaposed in parallel.

Then, the power generating body (the MEA comprising the current-collecting portion and provided with the sealant) is fixed on a container portion frame 22 while interposing therebetween a pore plate 6a and a porous membrane 21 comprising gas-liquid separation properties. The fixing may be performed by screw fastening with the use of an MEA holder plate 24, or by sealing the frame with the use of an adhesive.

Although, in FIG. 3, the gas-liquid separation membrane is overlaid as a porous membrane 21 on the entire surface of the pore plate 6a, the gas-liquid separation membrane may be buried only in the openings of the pore plate 6a. The pore plate 6a is desirably made of a chemically stable material such as fluorinated resin.

The porous membrane (gas-liquid separation membrane) 21 in this fuel supply portion (the combination of the pore plate 6a and the porous membrane (gas-liquid separation membrane) 21) is preferably made of a water-repellent porous body or hydrophilic porous body, and more preferably is formed by a structure in which a water-repelling material and a hydrophilic material are stacked in this order from the fuel storage portion side. This structure makes it possible to reduce the back-flow of product water produced in the power generation portion to the fuel storage portion. It is believed that this is because generated water vapor partially builds up condensation, which is held by the hydrophilic part and inhibited from passing through the water-repelling material.

The container portion 2a is provided with a fuel storage portion inserting space 23 designed such that the fuel storage portion 1 can be inserted into the same from one direction.

Figure 4:
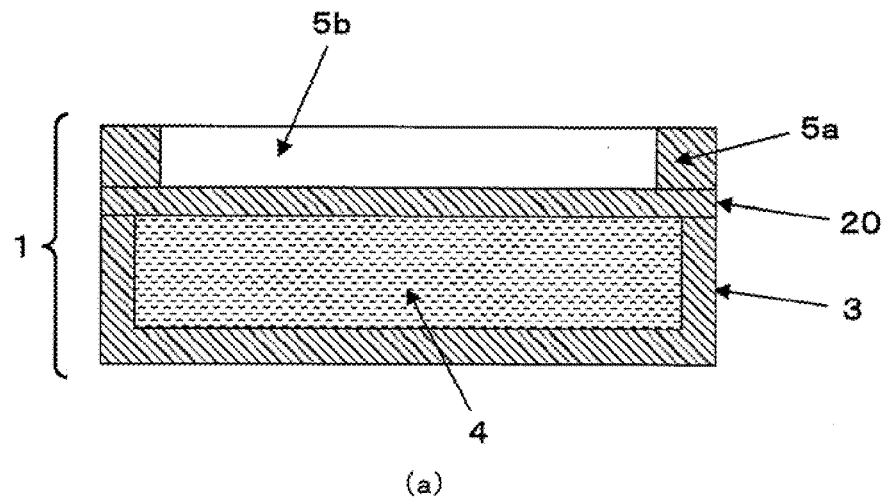
FIG. 4 shows cross-sectional views of a fuel storage portion, FIG. 4(a) being a longitudinal cross-sectional view of the fuel storage portion, FIG. 4(b) being a transverse cross-sectional view thereof, FIG. 4(c) being a longitudinal cross-sectional view showing a state in which the fuel storage portion is attached to a power generation portion.
Figure 4:
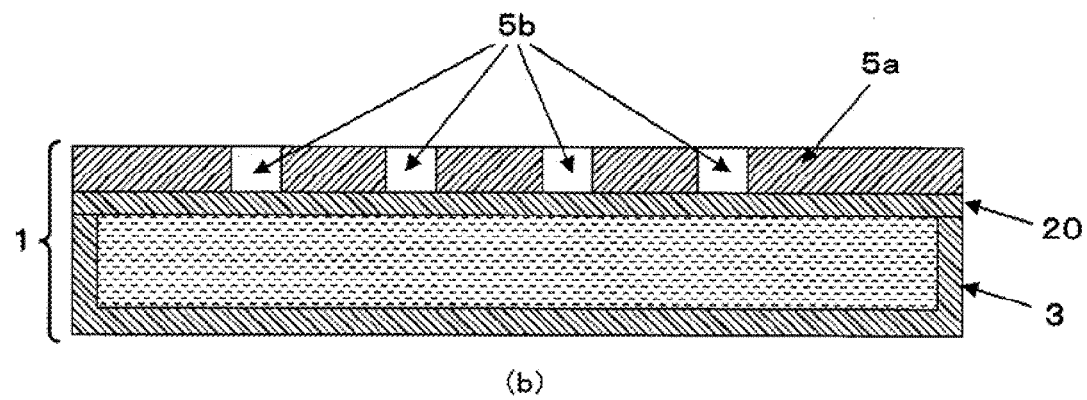
Figure 4:
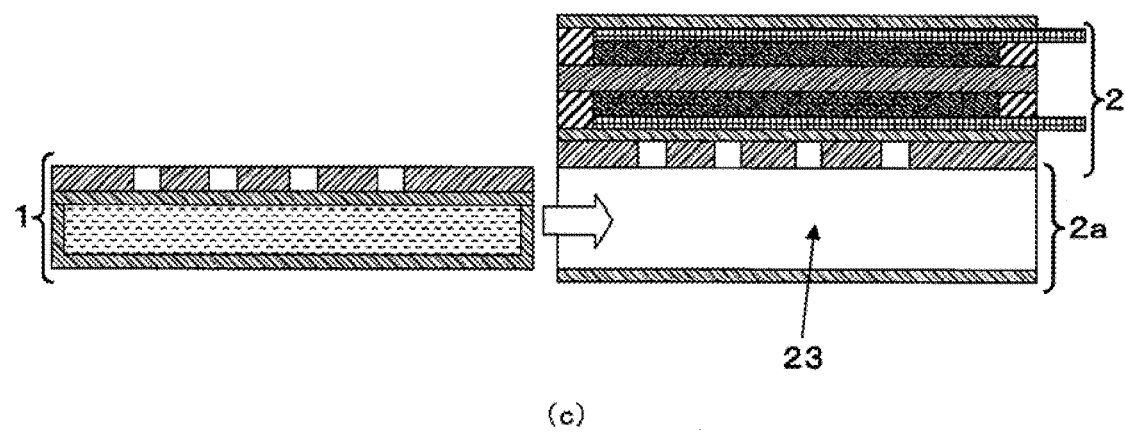

FIG. 4(a) and FIG. 4(b) are cross-sectional views of the fuel storage portion 1. As shown in FIG. 4(a), the fuel storage portion 1 is formed by stacking the gas-liquid separating porous membrane 20 and the pore plate 5a on the frame 3 and sealing the same. The fuel storage portion 1 is formed to comprise such external dimensions as it can be accommodated in the fuel storage portion inserting space 23. The materials for these components are desirably the same as those used in the power generation portion 2. When the fuel is liquid, it is desirable to place a hydrophilic porous body in the fuel holding portion 4 in order to ensure uniform distribution of the fuel. FIG. 4(b) is a cross-sectional view of the fuel storage portion 1 as viewed from the side direction of FIG. 4(a). FIG. 4(c) is a cross-sectional view showing how the fuel storage portion 1 is inserted into the fuel storage portion inserting space 23.

The porous membrane (gas-liquid separation membrane) 20 of the vaporization supply portion (the combination of the pore plate 5a and the porous membrane (gas-liquid separation membrane) 20) in the fuel storage portion 1 can be made of a porous body material comprising gas-liquid separation properties, for example a water-repellent porous membrane of PTFE (polytetrafluoroethylene) or a hydrophilic ion exchange membrane obtained by sulfonating a styrene material. The material is desirably selected such that the molar ratio of methanol and water supplied from the fuel storage portion 1 to the power generation portion 2 through the vaporization supply portion is greater than 1 ((methanol/water)>1).

In the pore plates 5a and 6a, the openings 5b of the pore plate 5a may be smaller than the openings 6b of the pore plate 6a. This configuration makes it possible to remarkably reduce the back flow of a product produced in the fuel electrode to the fuel storage portion 1. The ratio of the openings of the pore plate 5a to those of the pore plate 6a is desirably about 1.5 to 3.

The gas-liquid separating porous membranes 20, 21 in the fuel storage portion 1 and power generation portion 2 desirably comprise fuel permeation performance such that the total amount of fuel permeating through the porous membranes 20, 21 is equal to or smaller than the amount required for maximum power generation in the state where the opening ratio is 100%.

Since no liquid will leak out directly from the power generation portion 2 and the fuel storage portion 1 configured in this manner, the fuel storage portion 1 can be detached freely from the power generation portion 2 for a short period of time. In order to prevent unintended detachment of the fuel storage portion 1 from the power generation portion 2, the fuel storage portion 1 may be formed with a protruding portion while the power generation portion 2 is formed with a recessed portion such that the protruding portion is engaged in the recessed portion.

Further, it is desirable to enhance the sealing properties by providing a seal such as an O-ring on the frame of the power generation portion 2 in order to enhance the adhesion between the fuel storage portion 1 and the power generation portion 2. This makes it possible to further enhance the drive characteristics and the storage characteristics when the fuel storage portion 1 is inserted.

If the fuel storage portion 1 is left detached for a long period of time, the fuel may leak out from the gas-liquid separation membrane. Therefore, it is desirable to seal the pore plate 5a of the fuel storage portion 1 when the fuel storage portion 1 is detached. The sealing material used for this purpose may be a metal plate, plastic plate, or polymer membrane comprising low air permeability. The sealing material may be fastened by means of screws or concave-convex engagement, or may be attached simply with the use of an adhesive material. According to this embodiment, the pore plate 5a is located on the gas-liquid separation membrane 20. Therefore, the sealing material will not be in direct contact with the gas-liquid separation membrane 20, and hence the deterioration in performance due to damage to the gas-liquid separation membrane 20 can be prevented. The deterioration in air tightness due to deflection of the sealing material also can be prevented.

In order to reduce drying of the power generation portion 2 as well, it is desirable to shield the power generation portion 2 from ambient air. This can be attained by sealing the insertion opening or the pore plate 6 of the container portion 2a with a metal plate, plastic plate, or polymer membrane comprising low air permeability, or by inserting, into the fuel storage portion inserting space 23, a cubic body comprising no openings and comprising the same dimensions as those of the fuel storage portion 1.

According to this invention, the sealing performance can be improved significantly by attaching the fuel storage portion 1 such that its surface comprising no vaporization supply portion (the opposite surface therefrom) is located on the fuel electrode side at the time of storage.

Thus, this invention eliminates the need of preparing a special member for storage. Therefore, the invention not only enhances the storage characteristics but also improves the user-friendliness.

EXAMPLES

Specific description will be made of a solid polymer fuel cell according to this invention using Examples.

Example 1

A single-cell fuel cell comprising the configuration shown in FIG. 3 was fabricated by the procedures as described below. Firstly, catalyst supporting carbon particulates were prepared by causing carbon particles (Ketjenblack EC600JD from Lion) to support 55% by weight of platinum particulates comprising a particle diameter in the range of 3 to 5 nm. An adequate amount of 5% by weight Nafion dispersion solution from Dupont (tradename Nation DE521, "Nafion" is a registered trademark of Dupont; the same applies hereafter) was added to the 1 g of catalyst supporting carbon particulates and stirred to obtain a catalyst paste for an oxygen electrode. This catalyst paste was applied on a metallic porous substrate in an amount of 1 to 8 mg/cm$^2$, and dried to fabricate an oxygen electrode. Metal mesh made of SUS316L (with a thickness of 0.5 mm and porosity of 50%) was used as the metallic porous substrate. The metal mesh had a shape of a 40 mm by 20 mm rectangle, and was provided, at its end face, with an electrode terminal portion comprising a length of 10 mm and a width of 5 mm. A catalyst layer was applied on the metal mesh except this electrode terminal portion. On the other hand, a catalyst paste for a fuel electrode was obtained under the same conditions as those for obtaining the catalyst paste for the oxygen electrode described above except that particulates of platinum (Pt)-ruthenium (Ru) alloy comprising a particle diameter in the range of 3 to 5 nm were used in place of the platinum particulates. A fuel electrode was fabricated under the same conditions as those for fabricating the oxygen electrode described above, except that this catalyst paste was used.

Then, a membrane made of Nafion 117 from Dupont comprising dimensions of 50 mm by 30 mm by 180 μm thick was used as a solid polymer electrolyte membrane, and the oxygen electrode described above was arranged on one surface of this membrane in its thickness direction such that the metal mesh faced outside, while the fuel electrode described above was arranged on the other surface in the same manner and hot-pressed. Thus, an MEA was obtained in which the oxygen electrode and the fuel electrode were joined to the solid polymer electrolyte membrane.

In the next step, a frame-shaped sealant 25 made of silicon rubber (of a rectangular frame shape with external dimensions of 50 mm by 30 mm, a thickness of 0.5 mm, and a width of 5 mm) was attached to the oxygen electrode side in the part of the MEA where no electrolyte membrane was joined, and a PTFE porous body (with a porosity of 50%) of the same shape was attached to the fuel electrode side.

Subsequently, a pore plate 6a (with dimensions of 30 m by 50 mm, and three openings of 15 mm by 5 mm) made of PEEK (polyether ether ketone) resin and a PTFE porous membrane 21 (with dimensions of 30 mm by 50 mm, a thickness of 50 µm, and a porosity of 80%) were prospered. The pore plate 6a, the PTFE porous membrane 21, and the power generating body (fuel electrode current-collecting portion 8) were stacked in this order on a U-shaped container portion frame 22 (made of PEEK resin, and comprising external dimensions of 30 m by 50 m by 15 mm, and a wall thickness of 3 mm), and they were integrated by screw-fastening them with a net-like PE (polyethylene) resin plate (with external dimensions of 40 m by 50 mm and an opening ratio of 30%) used as an MEA holder plate 24, at the parts of the sealant 25.

Then, a PEEK resin frame 3 (with external dimensions of 24 mm by 50 mm by 12mm and a wall thickness of 2 mm) was prepared as the fuel storage portion 1. A PTFE porous membrane 20 (with dimensions of 24 mm by 50mm, a thickness of 50 µm, and a porosity of 80%) and a PEEK pore plate 5a (with dimensions of 24 mm by 50 mm, and three openings of 15 mm by 5 mm) were stacked on this PEEK resin frame 3, and the frame parts were thermally compressed with the use of a polyimide adhesive agent to integrate them. A urethane foamed porous body with porosity of 90% had previously been inserted in the fuel holding portion 4. The frame 3 was formed with two threaded holes (not shown in FIG. 3) comprising a diameter of 2 mm so that the threaded holes could be sealed by means of screws after fuel was injected through these holes.

When the fuel storage portion 1 was inserted into the power generation portion 2, silicon grease was applied on the outside of the frame 3 to fill the gap. It should be understood that an opening ratio of 100% is obtained when the fuel storage portion 1 is inserted in the power generation portion 2 in this manner and the end faces thereof become flush with each other, whereas an opening ratio of 0% is obtained when the fuel storage portion 1 is shifted by 5 mm from that position.

Example 2

A fuel cell was fabricated in the same manner as in Example 1 except that the provision of the gas-liquid separation membranes 20, 21 was omitted.

Example 3

Figure 5:
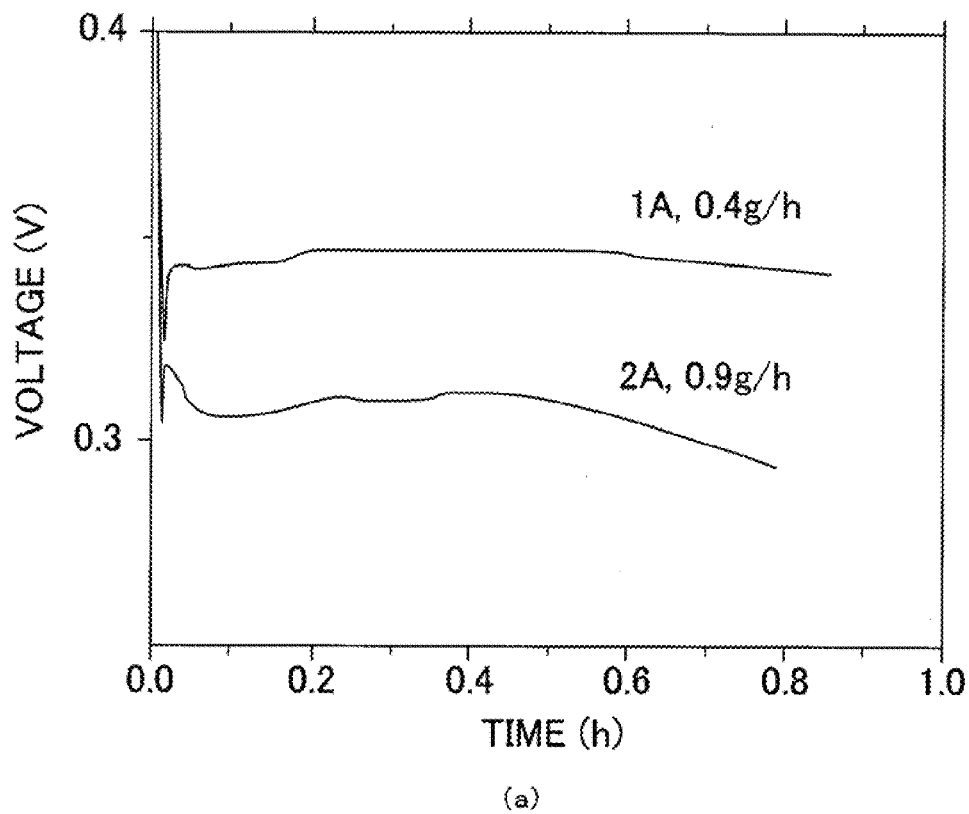
FIG. 5 shows power generation test results of Example 3, FIG. 5(a) showing the power generation test results of Example 3 when the opening ratio is 50%, FIG. 5(b) showing the power generation test results of Example 3 when the opening ratio is 100%.
Figure 5:
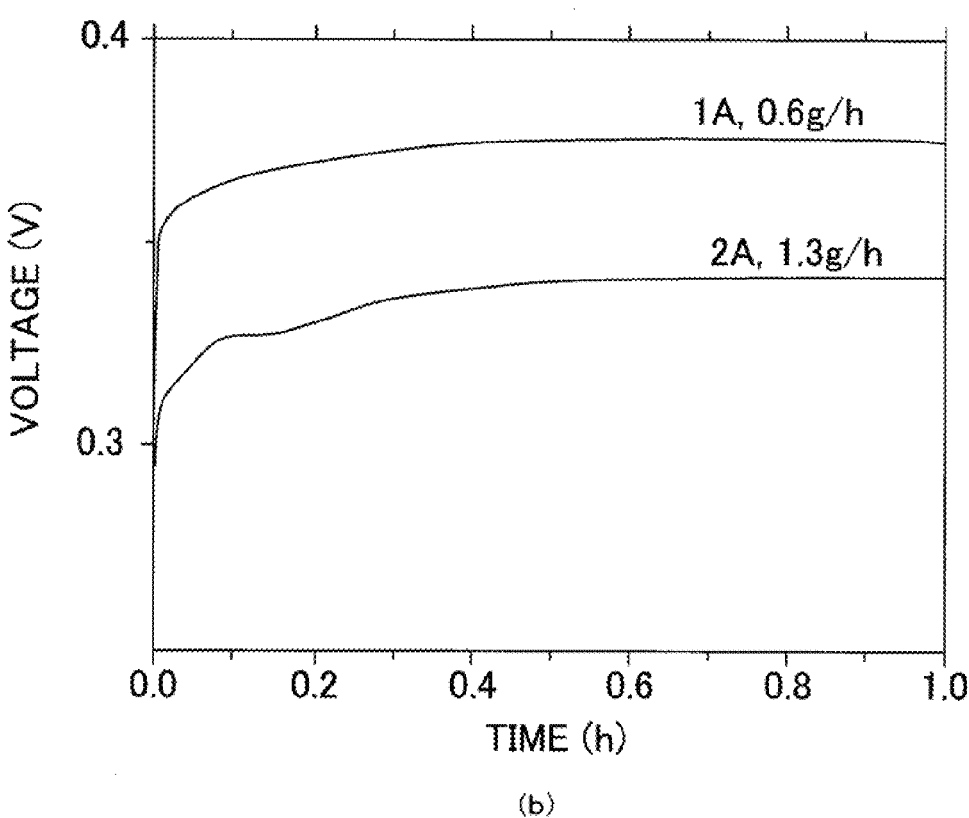

Power generation tests were conducted on the fuel battery cell fabricated in Example 1 under constant current, and test results are shown in FIG. 5. 30 volume % aqueous methanol solution was used as the fuel, and the fuel storage portion was filled with this and sealed. FIG. 5(a) shows the test results when power was generated under load current of 1 A and 2 A when the opening ratio was 50%, whereas FIG. 5(b) shows the tests results when power was generated under load current of 1 A and 2 A when opening ratio was 100%. The values beside the amperages indicate fuel consumptions per hour.

Looking at the test results under the load current of 1 A, the cell voltages are substantially the same between the opening ratio of 50% and the opening ratio of 100%, whereas the fuel consumption is lower and the energy capacity is higher when the opening ratio is 50%. On the other hand, it is found that, under the current load of 2 A, the cell voltage drops with time when the opening ratio is 50%, whereas a stable cell voltage can be obtained when the opening ratio is 100%. These results verify that the simple configuration of this invention is capable of controlling the fuel supply according to an amount of power to be generated, and thus is capable of optimizing the fuel use efficiency and the power generation stability.

Example 4

Figure 6:
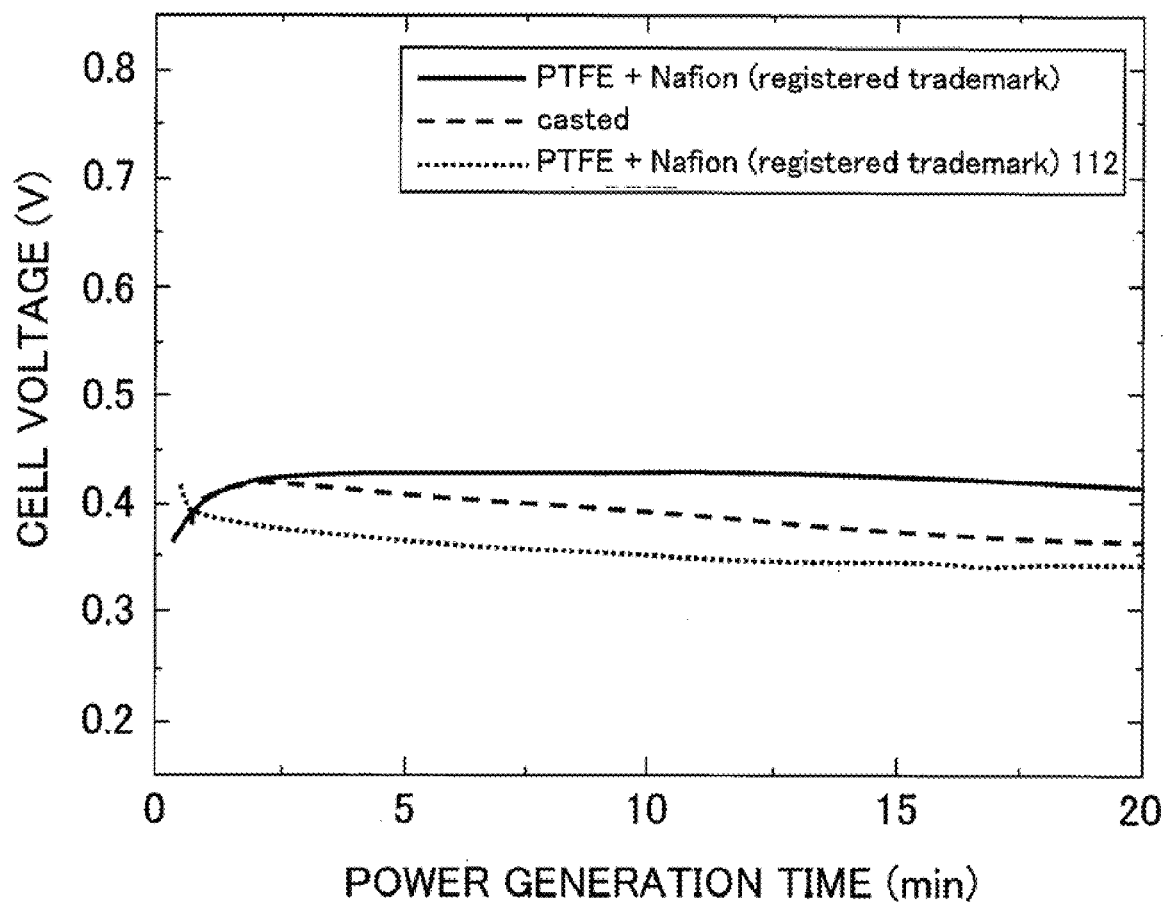
FIG. 6 shows comparative test results of Examples 1, 4, and 5.

In Example 1, a PTFE porous membrane (with a porosity of 80%) and a Nafion 112 membrane (from Dupont) comprising the same size as the PTFE porous membrane were attached to the fuel electrode side as gas-liquid separation membranes. As a result, as shown in FIG. 6, the cell voltage could be maintained higher during power generation than when only a PTFE porous membrane was used. It is believed this is because water produced in the power generation portion was consumed effectively in the fuel electrode without being discharged to the outside, to the fuel storage portion, for example.

Example 5

Similar power generation tests were conducted using a fuel cell obtained by filling the fuel electrode current-collecting portion (made of SUS316L) with a Nation binder (from Dupont) instead of the Nation 112 membrane (from Dupont) of Example 4 described above and casting the same (heat treating at 130° C.). In this case, the cell voltage could be maintained even higher. The results are shown in FIG. 6 together with the results of Example 4. It is believed that this is because water produced in the power generation portion is utilized more effectively in the fuel electrode by preventing diffusion of the fuel in the fuel electrode current-collecting portion.

Example 6

The fuel storage portion 1 was detached after the power generation tests conducted in Example 3, and it was found that nearly no liquid was left in the power generation portion 2, and no liquid was leaked at the time of detachment. It could be verified that the employment of this invention made it possible to separate the fuel storage portion 1 from the power generation portion 2 freely without causing leakage of liquid, and to significantly improve the convenience. Further, power generation could be performed stably without causing leakage of liquid even when the oxygen electrode of the fuel cell was placed facing upward, downward, or sideways.

Example 7

After the power generation tests conducted in Example 3, the fuel storage portion 1 was detached, and comparison was made for reduction rate of fuel concentration between when the vaporization supply portion was tightly closed and when not tightly closed. For tightly closing the vaporization supply portion, a pore plate 5a comprising a sealing adhesive polyimide tape (with a thickness of 100 µM, and not shown in FIG. 3) affixed thereto was prepared. The arrangement of the pore plate 5a on the gas-liquid separation membrane 20 according to this invention prevents the adhesive part of the tape from being in direct contact with the gas-liquid separation membrane 20, and thus the sealing part can be formed uniformly flush without damaging the gas-liquid separation membrane 2. Accordingly, improvement in sealing performance can be expected. Further, it is also advantageous that the tape can be used repeatedly as long as its adherence lasts. These two types of the fuel storage portions 1 thus prepared were stored for one week after power generation, and then these fuel storage portions 1 were checked for the residual quantities and concentrations of the fuel. As a result, it was found that the fuel in the fuel storage portion without the tape had been reduced to a half and only water was left. In contrast, the fuel in the fuel storage portion with the tape showed substantially no change either in amount or concentration. After that, the sealed fuel storage portion 1 could be used repeatedly. Thus, it could be verified that according to the configuration of this invention as described above, the fuel storage portion 1 could be easily closed tightly so that it could be attached and detached for repeated use, and hence the user friendliness could be significantly improved.

Example 8

After the power generation tests performed in Example 3, the fuel storage portion 1 was detached, and comparison was made for storage characteristics between when the power generation portion 2 was tightly closed and when not tightly closed. The tight closing of the power generation portion 2 was carried out by two ways: (1) by affixing an adhesive polyimide tape on the removal port, and (2) by inserting a PEEK-made box comprising exactly the same dimensions as those of the fuel storage portion 1 and tightly closing the same. These fuel storage portions were stored for one week after power generation, and then power generation was again performed to check the characteristics thereof. As a result, the cell voltage characteristics were recovered to the initial characteristics within 30 minutes after the insertion of the fuel storage portion 1 both in the cases of (1) and (2) described above. In contrast, when the fuel storage portion 1 was not tightly closed, the cell voltage characteristics were recovered to only 80% after two hours from the insertion of the fuel storage portion 1, and eventually were recovered to only 90%. This is believed to be due to the fact that the humidity retention conditions of their MEAs were different. Thus, it could be verified that according to the configuration of this invention, the power generation starting characteristics could be significantly improved by tightly closing the power generation portion 2 in a simple manner.

Example 9

In order to obtain the effects described in Examples 7 and 8 simultaneously, the fuel storage portion 1 was detached after power generation, and then the fuel storage portion 1 was inserted such that its surface where the vaporization supply portion was located faced the opposite side, and stored for one week. After the storage, the fuel storage portion 1 was detached and then power generation was again performed with the fuel storage portion 1 inserted such that the vaporization supply portion faced the fuel electrode side. As a result, equivalent starting characteristics to those of the case (2) in Example 8 were obtained after the storage. The residual amount and concentration of the fuel in the fuel storage portion 1 changed little after the storage. Thus, it could be verified that the employment of this invention improved the storage and starting characteristics without the need of any special configuration.

Example 10

Power generation was performed using the power generation cells used in Example 1, and then the cells were stored for one week, one in the state where the opening ratio of the pore plates was 0% and the other in the state where the opening ratio was 100%. Comparison was made for difference in power generation characteristics between before and after the storage. The cells were sealed with a simple cover to prevent oxygen from entering the oxygen electrodes. When power generation was performed after the cells were stored in this manner, the cell voltage of the cell stored with the opening ratio of 0% was reduced by about 30% immediately after being driven, in comparison with before the storage. However, as the power generating duration was increased, the performance was recovered to 90% of the performance before the storage. The concentration and storage amount of the fuel in the fuel storage portion did not vary after the storage, and thus it was confirmed that no fuel leaked out. In contrast, the output was deteriorated significantly when the fuel was stored in the cell with the opening ratio of 100%, and the performance was recovered only to 50% of that before the storage. Further, the amount and concentration of the fuel in the fuel storage portion 1 were reduced to a half. When the power generation cell was decomposed, it was found that the metallic current-collecting (electrode) portions used for the fuel electrode and oxygen electrode had been discolored. It is believed that occurrence of nonuniform fuel concentration probably generated a local battery and this deteriorated the characteristics. Thus, it could be verified that the employment of this invention made it possible to remarkably improve the storage characteristics by blocking the fuel supply to the fuel electrode when power generation is not performed (when the cell is stored).

Example 11

The fuel cells fabricated in Example 2 were subjected also to storage tests in a similar manner. As a result, the one with an opening ratio of 0% was able to maintain its characteristics better than the one with an opening ratio of 100%. However, even the one with an opening ratio of 0% showed slight discoloration in its electrodes. Thus it was found that the cell using a gas-liquid separation membrane was superior in storage characteristics.

Although specific description has been made on the solid polymer fuel cell of this invention using several Examples, this invention is not limited to these Examples.

Specifically, according to another embodiment of this invention, it is preferred that the fuel storage portion comprising the second opening member be relatively movable in a parallel direction to the surface of the first opening member of the power generation portion where openings are provided.

According to another embodiment of this invention, it is preferred that the openings of the first opening member be smaller than the openings of the second opening member.

According to another embodiment of this invention, it is preferred that a container portion be provided in the power generation portion for containing the fuel storage portion, and that the container portion be designed to contain the fuel storage portion such that the fuel storage portion is attachable to and detachable from the power generation portion.

According to another embodiment of this invention, it is preferred that the container portion be capable containing the fuel storage portion in its inverted state. The term "inverted state" as used herein means that the surface of the fuel storage portion facing the surface of the vaporization supply portion has been turned over to face the power generation portion side.

According to another embodiment of this invention, it is preferred that a gas-liquid separation membrane be provided on the entire surfaces of the first opening member and the second opening member or only in the openings thereof.

According to another embodiment of this invention, it is preferred that the gas-liquid separation membrane on the first opening member be of a two-layer structure comprising a hydrophilic material layer and a water-repelling material layer stacked in this order from the fuel electrode side.

According to another embodiment of this invention, it is preferred that the hydrophilic material layer be formed by casting a solid polymer electrolyte binder buried in the current-collecting portion of the fuel electrode, and be designed to also function as the current-collecting portion.

This application is the National Phase of PCT/JP2008/058586, filed Apr. 30, 2008, which is based upon and claims the benefit of priority from Japanese Patent Application No. 2007-128040, filed May 14, 2007, the disclosure of which is incorporated herein in its entirety by reference.

The invention claimed is:

1. A fuel cell comprising:
   a power generation portion at least comprising a fuel electrode, an oxygen electrode, and a solid electrolyte membrane interposed therebetween
   a fuel storage portion provided connectably to the power generation portion for storing fuel; and
   a container portion provided on the power generation portion for containing the fuel storage portion, the container portion being designed to contain the fuel storage portion such that the fuel storage portion is attachable to and detachable from the power generation portion,
   the fuel cell comprises the power generation portion comprising a first opening member comprising an opening on the fuel electrode side;
   the fuel storage portion comprises a second opening member comprising an opening;
   the opening of the first opening member and the opening of the second opening member are designed to be able to communicate with each other; and
   the fuel storage portion comprising the second opening member is relatively movable in a parallel direction to a surface of the first opening member of the power generation portion where the opening is provided.

2. The fuel cell as claimed in claim 1, wherein the container portion is capable of containing the fuel storage portion in its inverted state.

* * * * *